(12) United States Patent
Takaragi et al.

(10) Patent No.: US 6,879,372 B1
(45) Date of Patent: Apr. 12, 2005

(54) IMAGE PROCESSING APPARATUS AND METHOD THEREOF

(75) Inventors: Yoichi Takaragi, Yokohama (JP); Yasutomo Suzuki, Yokohama (JP); Yoshinori Ito, Kawasaki (JP); Takeshi Yamazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 50 days.

(21) Appl. No.: 09/010,618

(22) Filed: Jan. 22, 1998

(30) Foreign Application Priority Data

Jan. 31, 1997 (JP) .............................. 9-018772

(51) Int. Cl.[7] .......................... G03B 27/52; G03F 3/10; H04N 1/46
(52) U.S. Cl. .......................... 355/40; 355/55; 358/527; 358/528
(58) Field of Search .............................. 355/40, 38, 72, 355/46, 68, 41, 69, 71, 29, 75; 358/527, 487, 450, 540, 530, 514, 517; 353/25; 348/97; 399/19

(56) References Cited

U.S. PATENT DOCUMENTS

| | | | | |
|---|---|---|---|---|
| 5,457,549 A | * | 10/1995 | Kumada et al. | 358/530 |
| 5,622,365 A | | 4/1997 | Ito | 271/264 |
| 5,739,924 A | * | 4/1998 | Sano | 358/487 |
| 5,754,221 A | * | 5/1998 | Nishimura et al. | 348/97 |
| 5,828,932 A | * | 10/1998 | Ohata et al. | 355/75 |
| 5,829,853 A | * | 11/1998 | Hibino et al. | 353/25 |
| 5,852,503 A | * | 12/1998 | Kawaoka | 358/527 |
| 5,933,677 A | * | 8/1999 | Lee | 399/19 |

FOREIGN PATENT DOCUMENTS

| | | |
|---|---|---|
| JP | 63-166534 | 7/1988 |
| JP | 06-062201 | 3/1994 |
| JP | 07-156471 | 6/1995 |
| JP | 08-223329 | 8/1996 |

* cited by examiner

*Primary Examiner*—Peter B. Kim
(74) *Attorney, Agent, or Firm*—Fitzpatrick, Cella, Harper & Scinto

(57) ABSTRACT

An object of the present invention is to form an image effectively by reading the image from the same film on which the image and information concerning the image have been recorded in different methods. To attain the object, there is provided an image processing apparatus of the present invention comprising optical read means for optically reading image data from a film and magnetic read means for magnetically reading additional information concerning the image data from the film. Consequently, the image indicated by the image data can be formed effectively by automatically selecting the size of a paper, a zoom ratio of the image or the like on the basis of the additional information.

14 Claims, 16 Drawing Sheets

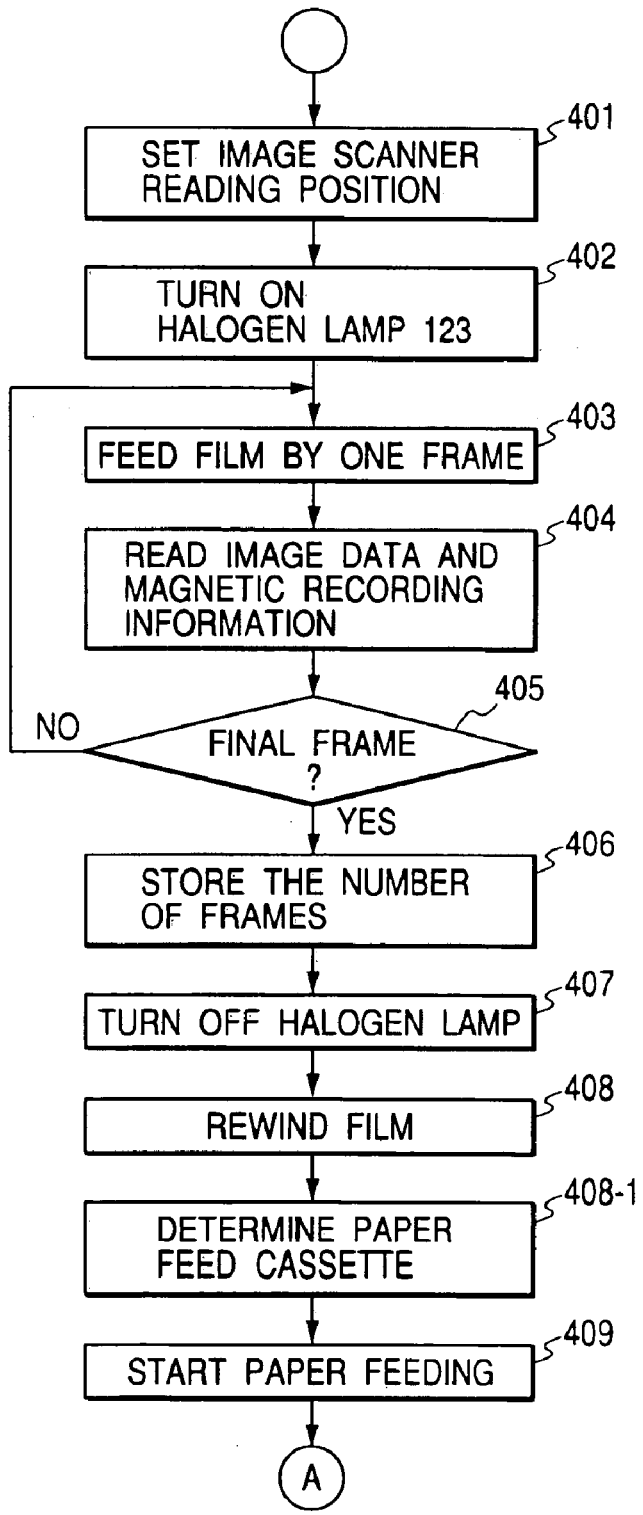

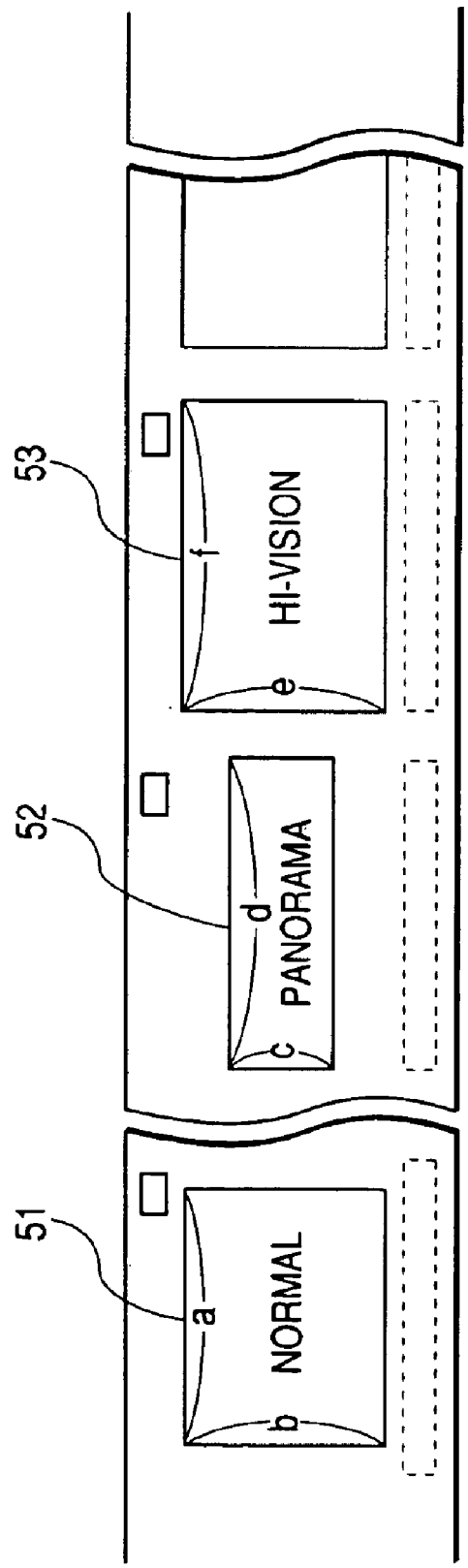

| FIG. 8A |
| FIG. 8B |

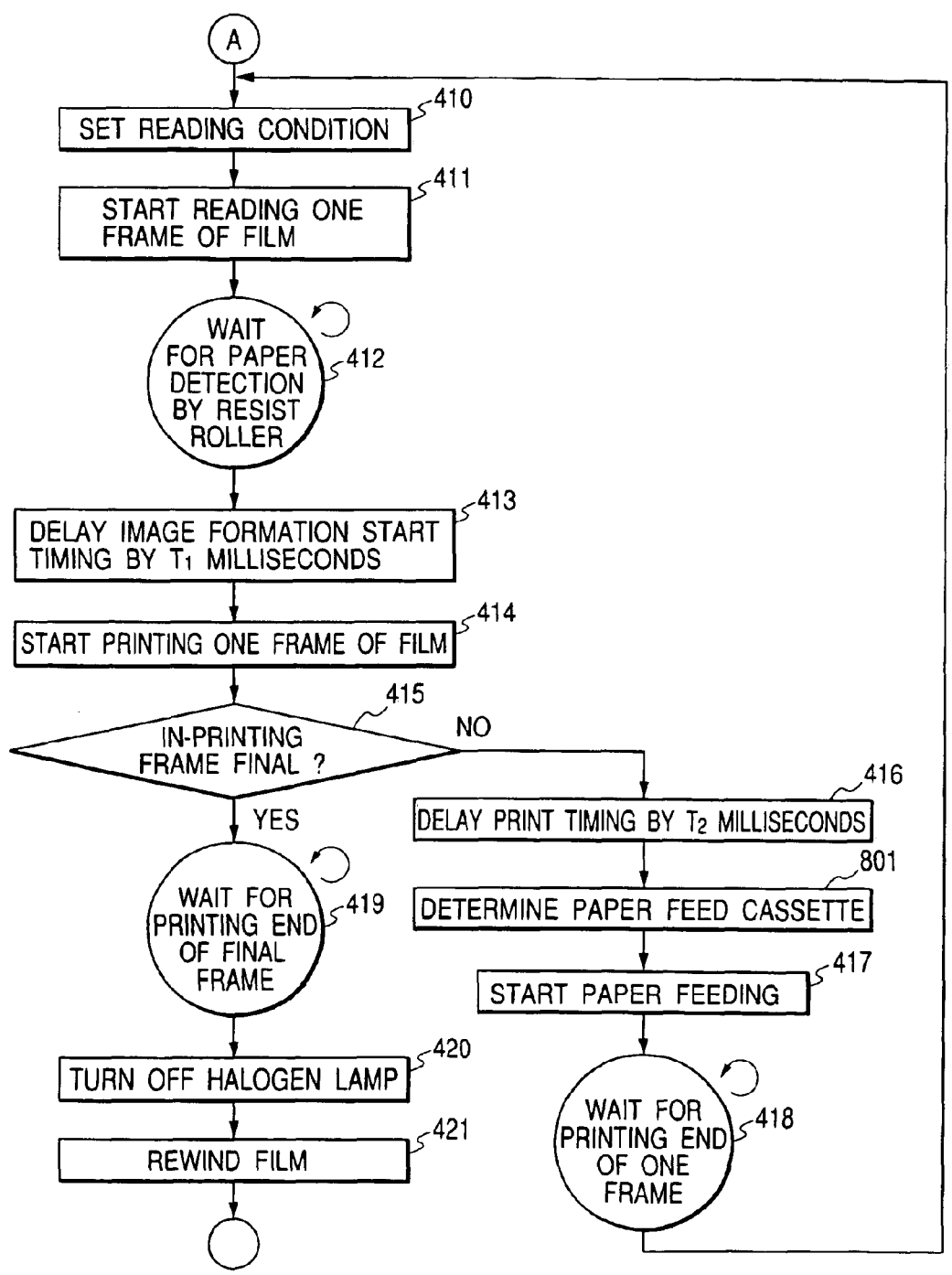

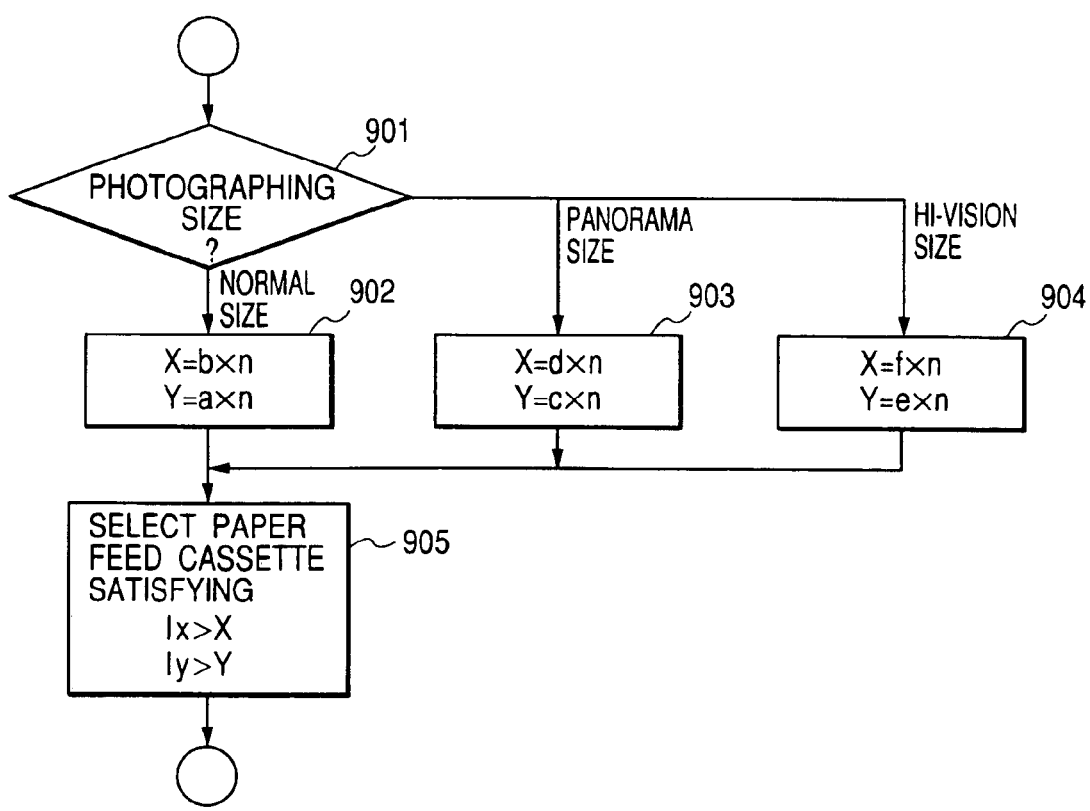

NORMAL FILM PHOTOGRAPHING AREA

PROJECTION AREA ON ORIGINAL MOUNTING BOARD GLASS
(n: PROJECTION MAGNIFICATION)

PAPER SIZE OF PAPER FEED CASSETTE (lx, ly)

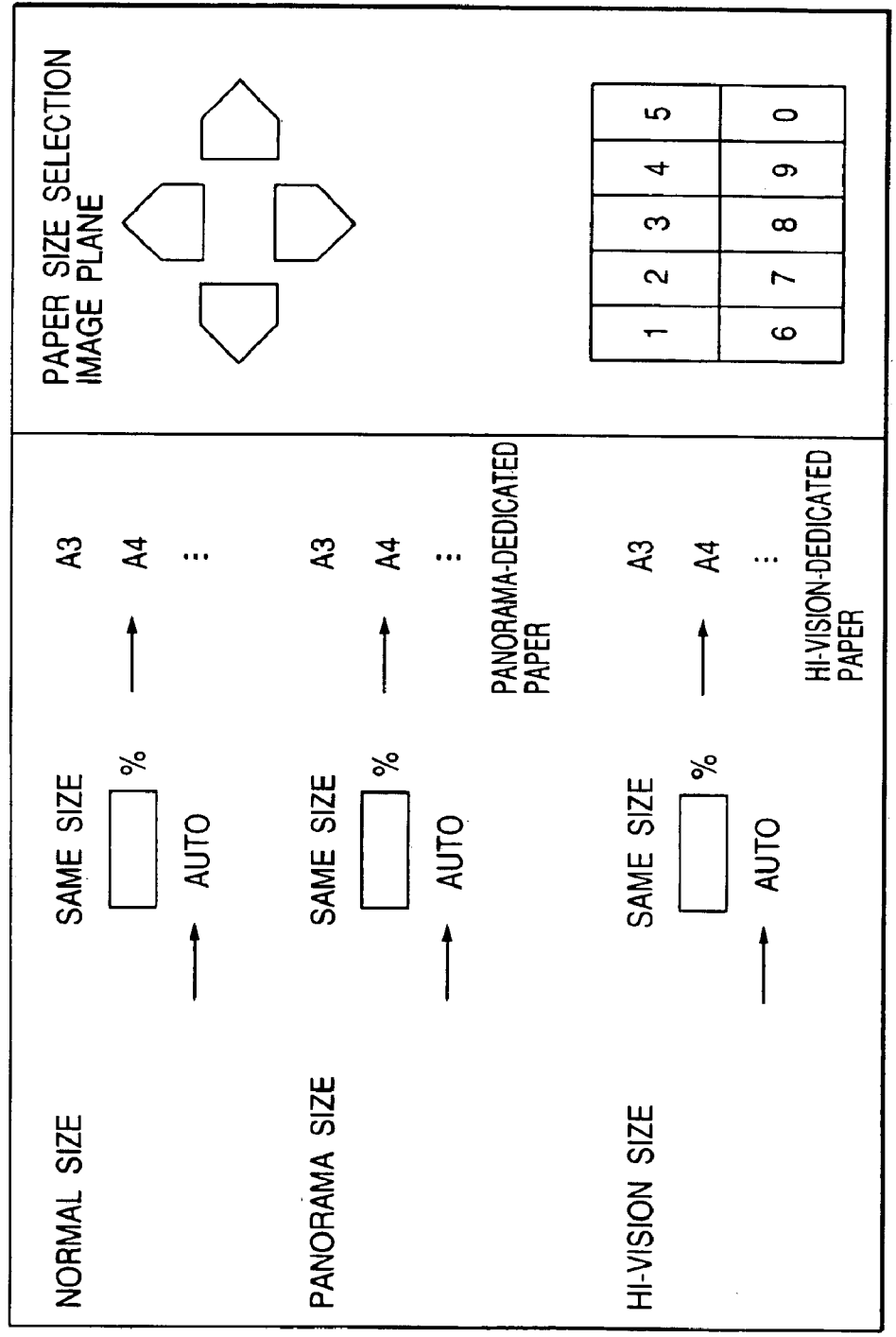

$\Delta x = l_1 + l_2$
$\Delta y = l_3 + l_4$
$Px = b \times n \times Nx$
$Py = a \times n \times Ny$

IMAGE PROCESSING APPARATUS AND METHOD THEREOF

BACKGROUND OF THE INVENTION

1. Field of the Invention

The present invention relates to image processing apparatus and method for reading, from a film on which an image has been optically recorded, the recorded image and performing an image process on the read image.

2. Related Background Art

Recently, a film (so-called Advanced Photographing System film) having a magnetic recording section has become wide spread as against a film for optically recording a photographic image.

Conventionally, in a color copy machine and the like, there is known a film projector for reading a film on which an image has been recorded by a conventional camera. In such the projector, the image read from the film can be printed by the color copy machine.

However, various designs have not been intended in case of printing the image recorded on the film having the magnetic recording section, from an image forming apparatus.

SUMMARY OF THE INVENTION

The present invention has been made in consideration of the above-mentioned conventional art. An object of the present invention is to perform effective image formation on an image which has been optically recorded on the film, by using additional information recorded on the same film by different method.

More particularly, the object of the present invention is to perform the effective image formation on the image which has been optically recorded on the film, by using information concerning a size of the image magnetically recorded on the same film.

For instance, the object is to save such an inconvenient operation as selecting a paper by manual operation.

To attain the above-mentioned object, according to one preferable embodiment of the present invention, there is provided an image processing apparatus which comprises: optical read means for optically reading image data from a film, magnetic read means for magnetically reading additional information concerning a size of the image data from the film, and selection means for selecting and feeding a predetermined paper from among a plurality of different papers on the basis of the additional information by the magnetic read means.

In addition to the above-mentioned main object, an another object is to provide structure for forming the plural images at a high speed even if a plurality of images have been recorded on the film.

To attain the above-mentioned another object, according to one preferable embodiment of the present invention, the size of a paper fed by the selection means has been previously set in accordance with the additional information concerning the size of the image data.

In addition to the above-mention main object, a still another object is to save such an inconvenient operation as selecting an appropriate image zoom ratio by the manual operation.

To attain the above-mentioned still another object, according to one preferable embodiment of the present invention, the image processing apparatus further comprises set means for setting a size of a paper fed by the selection means, and control means for controlling a zoom ratio in case of printing the image data read by the optical read means in accordance with the additional information concerning the size of the image data.

Further another objects and feature of the present invention will become apparent from the following embodiments and accompanying drawings.

BRIEF DESCRIPTION OF THE DRAWINGS

FIG. 5 is a view for explaining a photographing size of a photographic image recorded on a film;

FIG. 9 is a flow chart showing a procedure of a process in a case where the paper feed cassette is selected;

FIG. 11 is a view indicating the console unit for setting the image data recorded on the film in an automatic zoom mode;

DETAILED DESCRIPTION OF THE PREFERRED EMBODIMENTS

Figure 1:
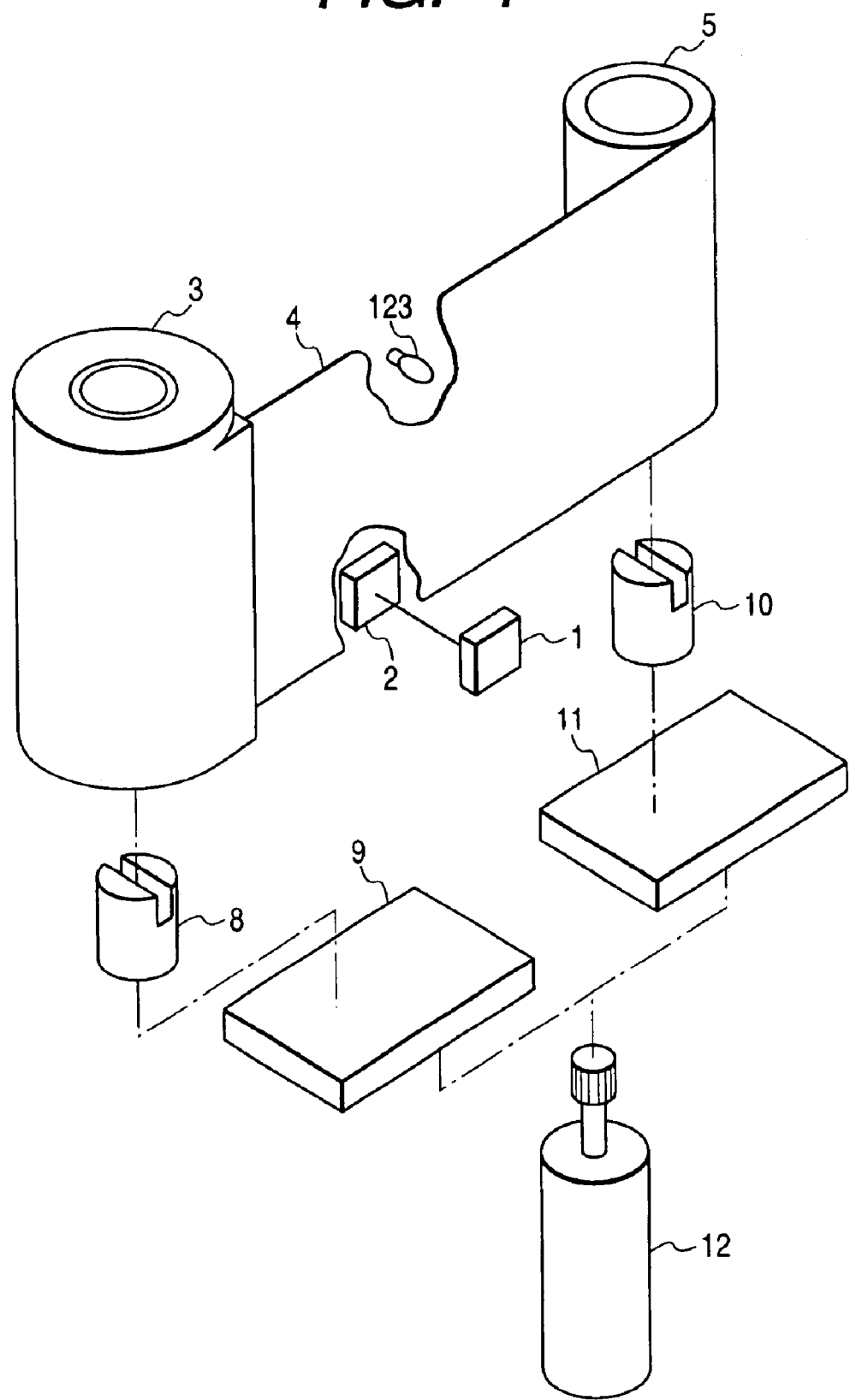
FIG. 1 is a view for explaining a film feed unit and a magnetic record read unit.

FIG. 1 is a view for explaining an APS film feed unit and a magnetic record read unit used in embodiments of the present invention.

FIG. 1 shows a magnetic head 1 corresponding to a read means for reading photographing date and time, a hold pad 2 for holding the magnetic head 1, a film cartridge 3, a film 4 having a magnetic recording section, a spool 5 for rewinding the film, a light source 123 for scanning, a feed fork 8 for feeding the film, a gear unit 9 for feeding the film, a fork 10 for driving the spool 5, and a gear unit 11 for driving the spool. A feed motor 12 is connected to the gear unit 9 for feeding the film and the gear unit 11 for driving the spool.

At a time when the film 4 is moving by a rotating operation of the feed motor 12, data of photographing date and time magnetic recorded on the film 4 is read by the magnetic head 1.

Figure 2:
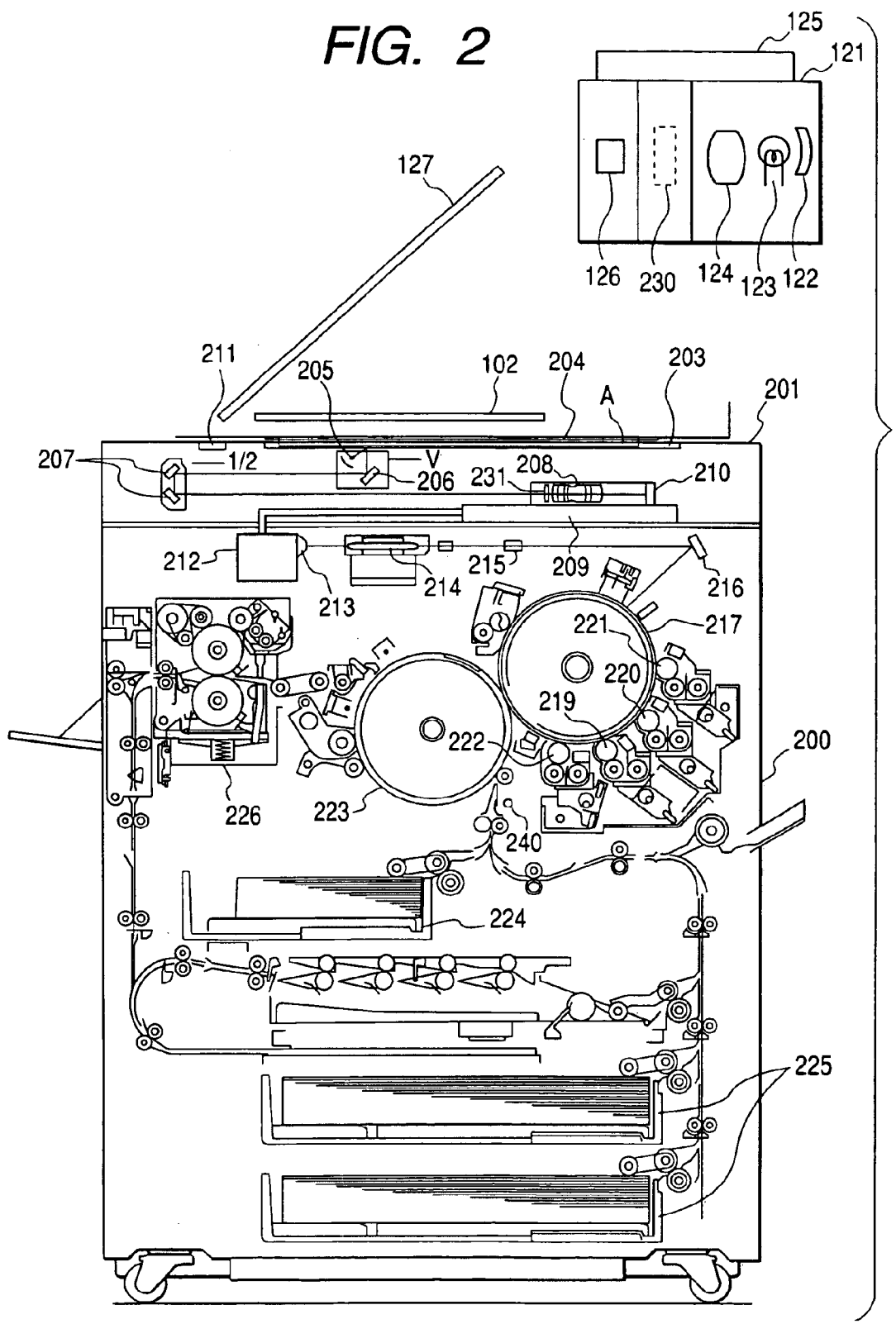
FIG. 2 is a view showing an entire of an image processing apparatus used in first to third embodiments.

FIG. 2 is a view showing a sectional constitution of an image processing apparatus used in an embodiment of the present invention. The image processing apparatus includes the APS film feed unit and the magnetic record read unit.
(Description of Image Scanner Unit)

In FIG. 2, an image scanner unit 201 reads an original image in a color mode for executing a required digital signal process. A printer unit 200 prints out an image on a recording paper in a full-color mode corresponding to the original image which is read at the image scanner unit 201. A console unit A provided at an upper portion of the image processing apparatus has a liquid crystal display and a touch panel.

At the image scanner unit 201, an original 204 mounted on an original mounting glass 203 (platen) is irradiated by a halogen lamp 205. Reflected light from the original 204 is conducted to mirrors 206 and 207 to form an image on a three-line sensor 210 (hereinafter, called as "CCD") through a lens 208. The lens 208 has an infrared ray cutting filter 231.

The CCD 210 color separates light information from the original 204 and reads red (R), green (G) and blue (B) components of full-color information, thereafter, data is transmitted to an image signal process unit 209. Each of color component read sensor columns at the CCD 210 is composed of 5,000 pixels. Therefore, an A3 size original which is the maximum size original to be mounted on the original mounting glass 203 can be read at a resolution of 400 dpi in its short-edge direction 297 mm.

The halogen lamp 205 and the mirror 206 move, mechanically at a speed of v, the mirror 207 moves mechanically at a speed of (½)v to a vertical direction (hereinafter, called as a "sub-scanning direction") against an electrical scanning direction of the line sensor 210 (hereinafter, called as a "main-scanning direction"). Thereby, an entire surface of the original 204 is scanned.

A standard white plate 211 produces correction data of read data which is at the R, G and B sensor 210. The standard white plate 211 indicates almost uniform reflecting characteristic in a visible radiation and has white color in a visible condition. Here, output data from the R, G and B sensor 210 is corrected using the standard white plate 211.

The image signal process unit 209 performs a switching of an R, G and B image signal which is read and an image signal which is input through a controller from a host computer. At the same time, the input signal is electrically processed for separating into each component of magenta (M), cyan (C), yellow (Y) and black (Bk). Thereafter, an image signal of each component of magenta (M), cyan (C), yellow (Y) and black (Bk) is transmitted to the printer unit 200.

One component within each component of M, C, Y and Bk is transmitted to the printer unit 200 (image formation sequential plane) per one-time of original scanning (scan) at the image scanner unit 201. Then, a printing out of one-sheet is accomplished depending on the total of four-times original scanning.
(Description Printer Unit)

In the printer unit 200, each image signal of M, C, Y and Bk which is image processed is transmitted to a laser driver 212. The laser driver 212 modulation drives a semiconductor laser unit 213 in accordance with the transmitted image signal. A laser beam from the semiconductor laser unit 213 scans a surface of a photosensitive drum 217 through a polygon mirror 214, F-θ lens 215 and a mirror 216.

A development unit is composed of a magenta development unit 219, a cyan development unit 220, a yellow development unit 221 and a black development unit 222. Each of four drums mutually contacts the photosensitive drum 217 to develop a latent image of M, C, Y and Bk formed on the photosensitive drum 217 using the corresponded toner.

A paper fed from a paper feed cassette 224 or a paper feed cassette 225 is rolled up to a transfer drum 223 which rotates in contacting with the photosensitive drum 217 when the latent image of each component of M, C, Y and Bk formed on the photosensitive drum 217 is developed using the toner for transferring a toner image which is developed to paper sequentially.

Thus, the paper is discharged passing through a fixing unit 226 after toner images corresponding to four colors of M, C, Y and Bk are sequentially transferred.

A paper feeding resist sensor 240 produces a timing for starting to read a film judging from the timing of the fed paper crossing the sensor.
(Description of APS Film Projecting Unit)

A reference numeral 230 denotes the APS film feed unit and the magnetic record read unit described in FIG. 1.

A projector unit 121 includes a lamp condenser lens and the like. A reflection plate 122 reflects the light from a halogen lamp 123. A reference numeral 124 denotes a condenser lens, 126 denotes a projection lens, and 127 denotes a reflection mirror. A fresnel lens 102 forms a film image on a read unit which is provided in a scanner. An automatic carrier 125 rotationally moves a plurality of films stored in the APS film feed unit and the magnetic record read unit 230 for sequentially conveying the films to a reading position. Then, the automatic carrier 125 fetches out the films from the reading position after terminating to read. The film image is read at a CCD 103 by projecting a transmission light from the projector unit 121 to an original mounting glass 101.

Figure 3:
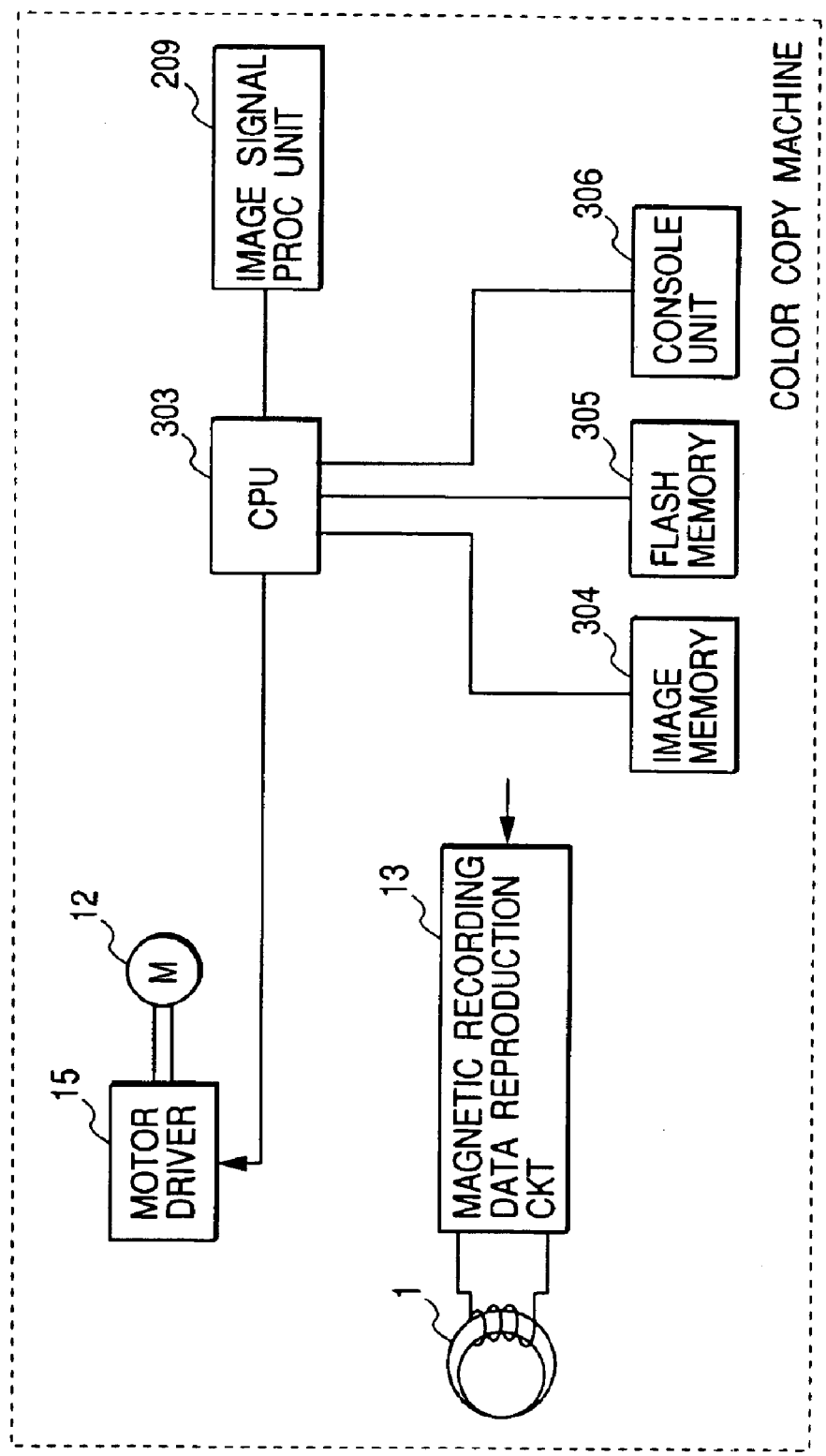
FIG. 3 is a typical view for explaining a control unit for electrically controlling the entire of the image processing apparatus.

FIG. 3 is a view for explaining an electrical control section of a color copy machine of the present embodiment, which has the above-mentioned constitution.

A magnetic recorded data reproduction circuit 13 reads magnetic recorded data on the film. A motor driver 15 drives a feed motor 12.

An image memory 304 can store image data which is read from the film and magnetic recorded data.

A CPU 303 manages control of the apparatus entirely. A flash memory 305 memorizes an execution control program of the apparatus and the like. At a console unit 306, various instructions for an entire apparatus are input. The image signal process unit 209 performs various image processes required in the copy machine.
(First Embodiment)

Figure 4B:
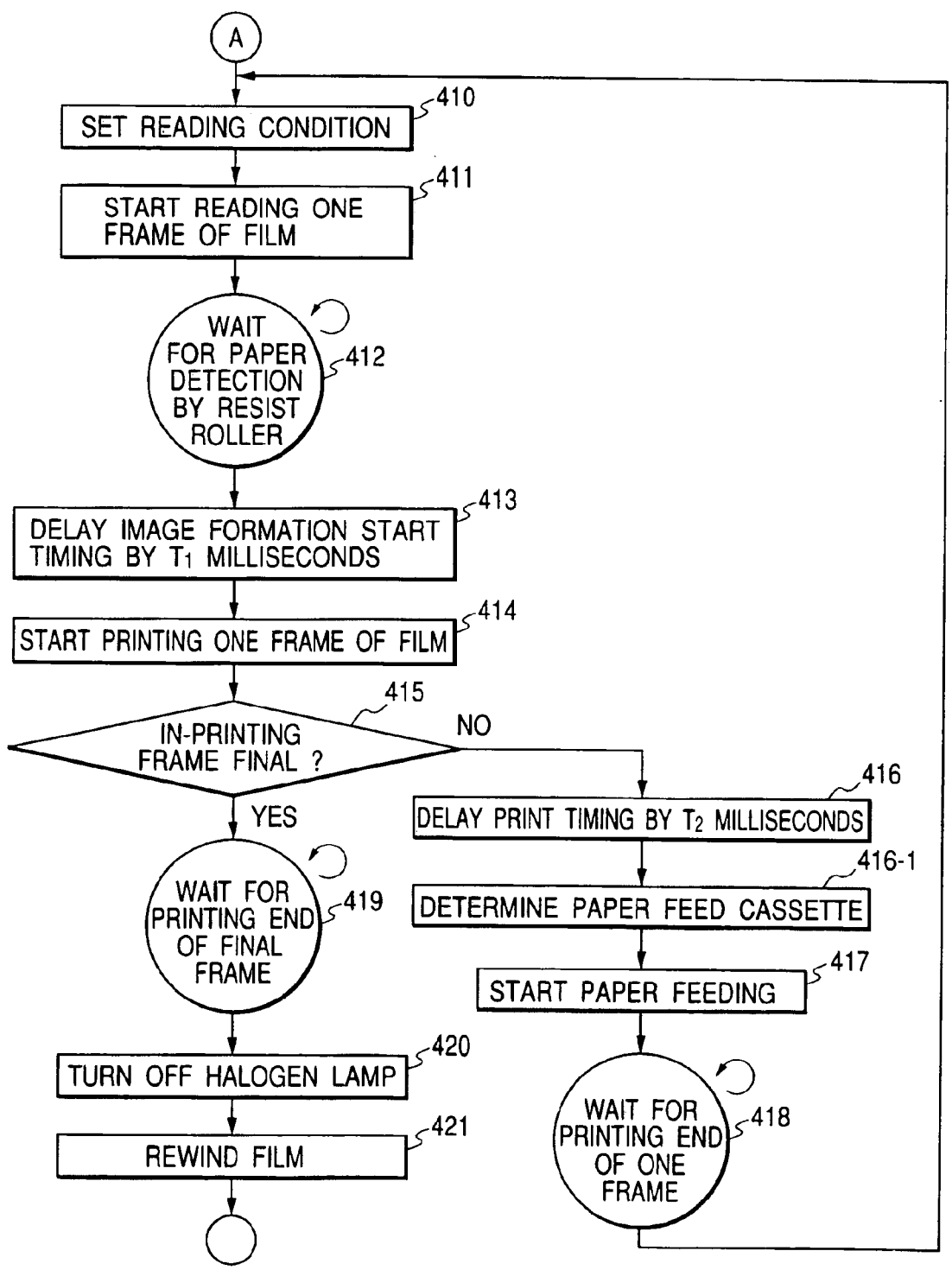
FIG. 4 which is composed of FIGS. 4A and 4B is a flow chart showing an operation of the image processing apparatus in the first embodiment.

FIGS. 4A and 4B are views for explaining the process of the CPU 303 as to processes from a step of film reading to a step of image forming.

At first, magnetic recorded information which is recorded on the film and image data are previously read in steps 401 to 407 for grasping a process condition at a time of printing and the number of frames (planes). In steps 408 to 420, a paper feed cassette is determined on the basis of the magnetic information on the film which is previously read, thereafter, a reading of the film image and a paper feeding operation are executed simultaneously.

Each of steps 401 to 421 will be described in the following particularly.

At first, mirrors 206 and 207 are driven for fixing a scanner reading position to a specific position of the fresnel lens 102 in the step 401.

Next, in the step 402, the halogen lamp 123 is turned on. The CPU 303 outputs a control signal to the motor driver 15 for rotating the feed motor 12 which feeds the film 4 by one frame (a photograph of one plane) in the step 403.

In feeding the film, the CCD 210 reads image data and the magnetic head 1 reads the magnetic recorded data which is recorded on a magnetic material (magnetic record unit) coated on the film 4 simultaneously in the step 404.

At this time, the magnetic recorded information to be read includes image direction information (longitudinal or lateral), a frame number (what number of photograph), photographing date and time, photographing size information (panorama, hi-vision, normal or the like) and color-temperature information.

The image direction information indicates if an image is photographed by photographing in a longitudinal position or photographing in a lateral position. The photographing size information indicates if a photographed image is the normal size (ratio of longitudinal by lateral is equal to 3:4), the panorama size (ratio of longitudinal by lateral is equal to 3:8) or the hi-vision size (ratio of longitudinal by lateral is equal to 9:16).

The magnetic recorded information which is read is stored in the image memory 304.

A luminance histogram is produced for each of R, G and B signal from the image data which is read to calculate various parameters used in the image signal process unit 209 at the time of sequential processes of a reading of the image data, an image processing and a printing. Since a technique as to a calculation of parameters used in the image signal processing is known as a process of reading a film projector in a color copy machine, the description will be omitted.

Next, in the step 405, it is judged whether a frame which is read in the step 404 is a final frame or not, within the designated frames. In the present embodiment, the designated frames are defined as all frames in the film. However, it is not limited to this, but the number and order of frames to be read may be designated from a console unit A or the like.

In the step 406, the number of frames which are read is stored in the image memory 304.

In the step 407, the halogen lamp 123 is turned off.

Thereafter, the printing process based on the above-mentioned preparatory image reading is executed.

In the step 408, the film corresponding to the number of frames previously read is rewound. In this case, the film has to be rewound to a first frame. However, it is not limited to this, but the film may be rewound to a frame to be read at first within the designated frames, namely the frame is effectively read.

In the step 408-1, the paper feed cassette is determined in accordance with each size of photographing images, if which is the normal size, the panorama size or the hi-vision size.

Figure 6:
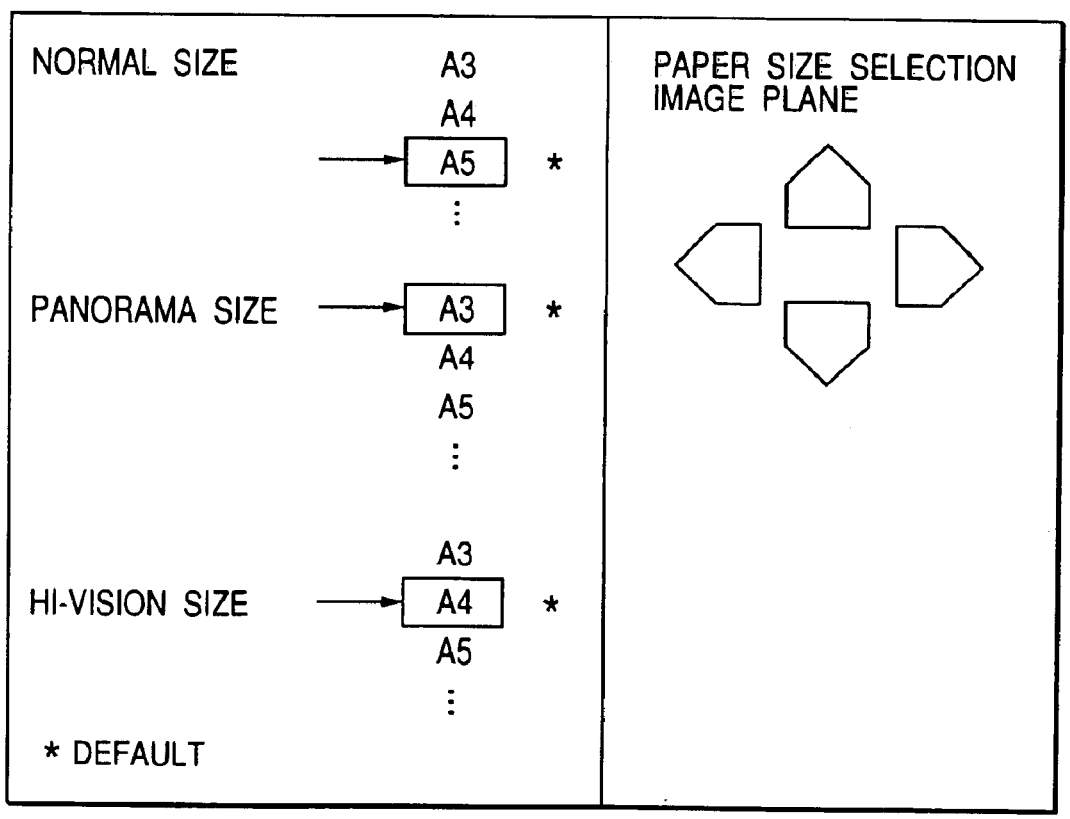
FIG. 6 is a view showing a displaying state of a console unit for selecting a paper feed cassette.

The paper feed cassette is previously designated by an operator based on a display screen of the console unit A shown in FIG. 6.

A printing magnification corresponding to each frame is automatically determined depending on the selected paper feed cassette. Therefore, a desired photographic image can be obtained even if the operator does not set the detailed magnification.

In the present embodiment, the paper feed cassette indicated in a default is an A5 size in case of a normal sized photographing image, the paper feed cassette indicated in the default is an A3 size in case of a panorama sized photographing image and the paper feed cassette indicated in the default is an A4 size in case of a hi-vision sized photographing image. However, the paper feed cassette may be changed by an user later.

In the step 409, feeding papers from each paper feed cassette, which is selected on the basis of the magnetic information, before reading a frame to be applied is started.

In the step 410, a parameter used for the image signal processing calculated from image data which is read stored in the image memory 304 in the step 404 is set in the image signal process unit 209.

An area of reading is determined based on the stored photographing size information (normal size, panorama size, hi-vision size or the like), thereby the image signal process unit 209 is controlled so as to produce the corresponding reading area signal.

In the step 411, reading the film image is started. The feed motor 12 is driven synchronized with an operation speed of the CCD 210 which reads frames of the film while the film is moving.

The image which is read in this step is stored in the image memory 304.

According to the above-mentioned method, film image data corresponding to one frame can be stored in the image memory 304 from the CCD 210 side without moving the mirrors 206 and 207.

Therefore, the influence of mirror surface vibration owing to the moving of the mirrors 206 and 207 at the time of reading the image data can be removed. Namely, the R, G and B signals suppressed color displacement can be obtained.

Next in the step 412, waiting is started for the paper, which has been formerly started to feed, to reach the resist sensor 240.

In the step 413, a timing to start forming an image is controlled so that an image corresponding to a frame which is read is printed on a predetermined position of the paper.

In the step 414, the semiconductor laser unit 213 is driven based on the image data in the image memory 304 for starting to form an image.

In the step 415, it is judged whether a frame of the film in printing is a final frame or not. If it is not the final frame, the process advances to the step 416.

In the step 416, it is guaranteed to have a time interval after feeding the paper in former by delaying a predetermined time ($T_2$ milliseconds).

In the step 416-1, the paper feed cassette corresponding to a frame to be read next is determined in same manner as that of the step 408-1.

In the step 417, feeding of a next paper is started based on the determination in the step 408-1.

In the step 418, waiting for an image forming operation by the semiconductor laser 213 to end is conducted.

Depending on the judgement in the step 415, in a case where the frame in printing should be the frame to be read finally, the process advances to the step 419 to wait for the printing of the final frame to be is terminated. Next, in the step 420, the halogen lamp 123 is turned off. Then, the film is rewinded to the first frame in the step 421.

As described above, a printing speed can be improved by performing a film image reading operation and a paper feeding operation simultaneously in accordance with the procedure shown in FIGS. 4A and 4B.

A sensor for reading the film can be saved by reading the film while feeding it utilizing a read sensor of a reflected original.

(Second Embodiment)

FIGS. 7 through 10A to 10C are views concerning the second embodiment of the present invention. In the above-mentioned first embodiment, the designated paper feed cassette is selected in accordance with such magnetic information as the normal size, the panorama size and the hi-vision size.

Figure 7:
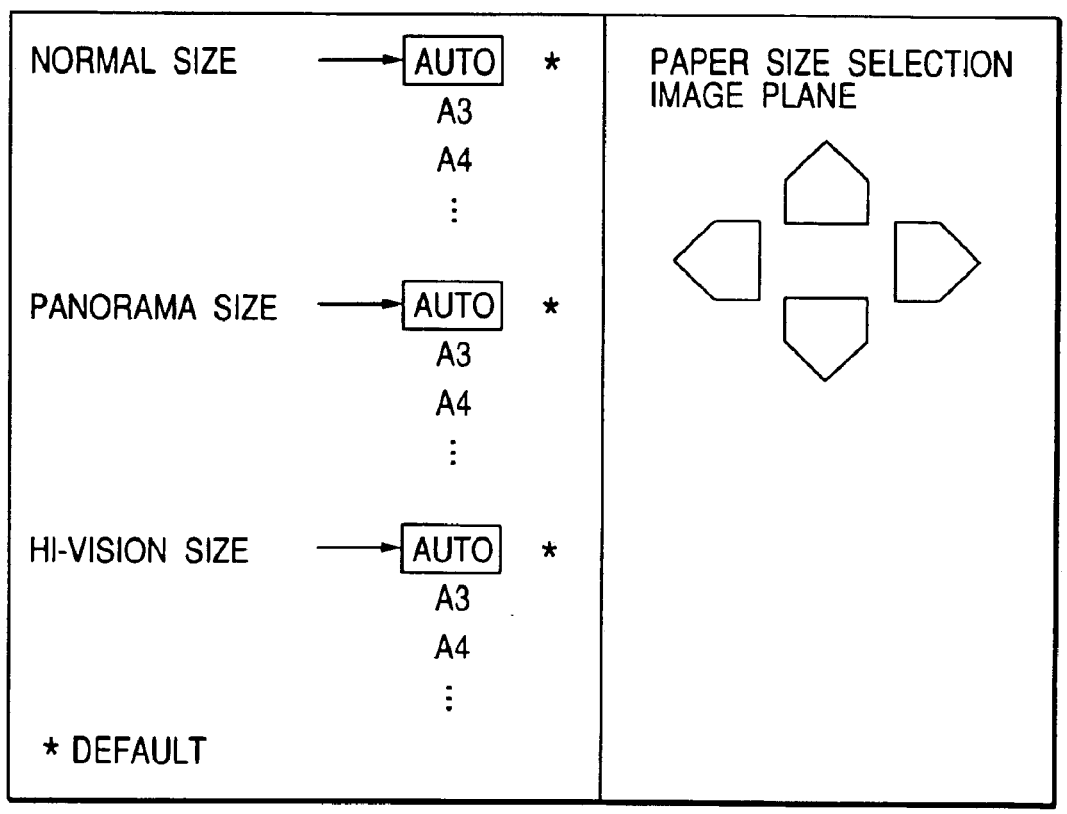
FIG. 7 is a view indicating the console unit in a case where an automatic mode for selecting the paper feed cassette is set.
Figures 8, 8A:
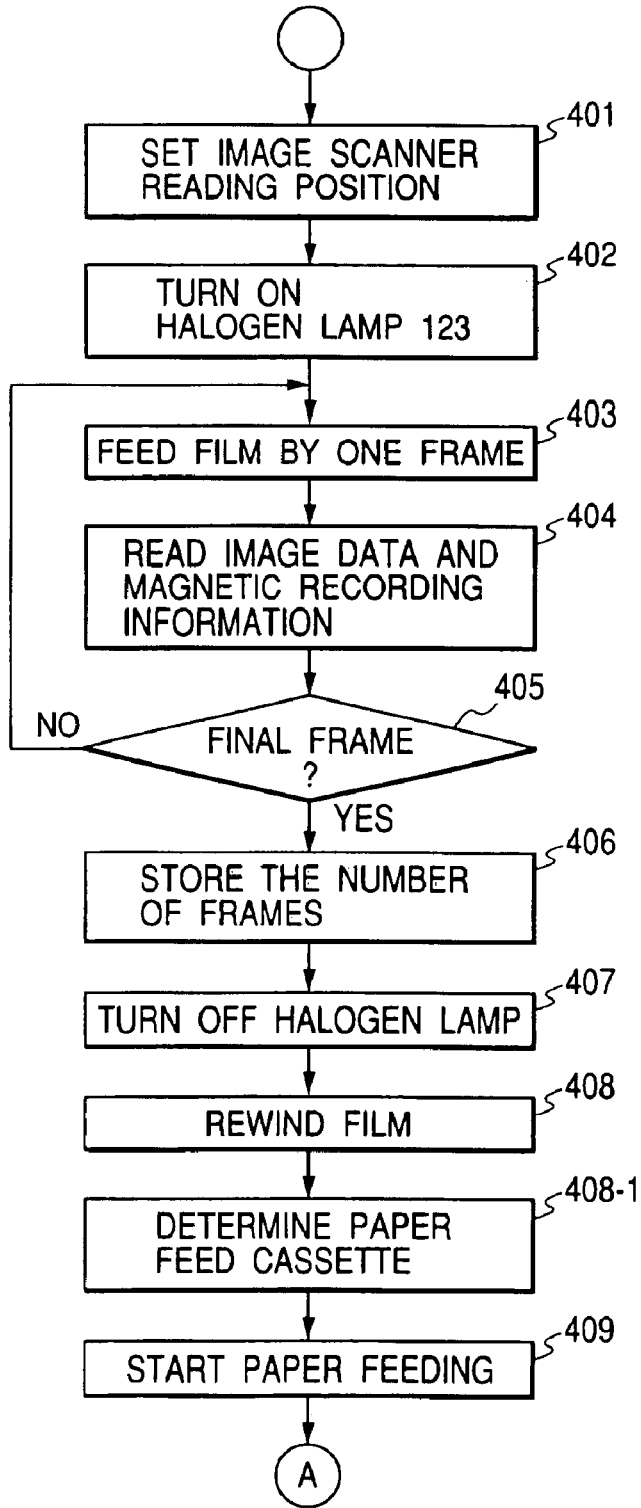
FIG. 8 which is composed of FIGS. 8A and 8B is a flow chart showing an operation of image processing in the second embodiment.

On the other hand, in the second embodiment, when a designation of the paper feed cassette is set in an automatic selection mode as shown in FIG. 7, the paper feed cassette is automatically selected by the procedure shown in FIGS. 8A and BB through 10A to 10C.

In the following, the procedure will be described in detail. Since an operation in FIGS. 8A and 8B is executed by the same procedure as that of FIGS. 4A and 4B mentioned above except for the step 416-1 in FIG. 4B, the description other than the step 416-1 will be omitted.

FIG. 9 is a flow chart showing an operation procedure of the CPU 303 and explains an operation in a step 801 in FIG. 8B in detail instead of the step 416-1 in FIG. 4B.

In a step 901 in FIG. 9, it is judged if the frame which is read is the normal size, the panorama size or the hi-vision size referring to the magnetic recorded information which is read in the step 404.

In case of the normal size 51, a calculation process in a step 902 is executed. In case of the panorama size 52, calculation process in a step 903 is executed. In case of the hi-vision size 53, a calculation process in a step 904 is executed.

Figure 10A:
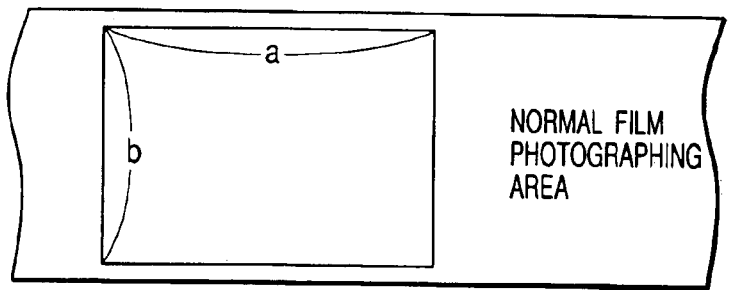
FIGS. 10A, 10B and 10C are views showing the printed state of image data recorded on the film.
Figure 10B:
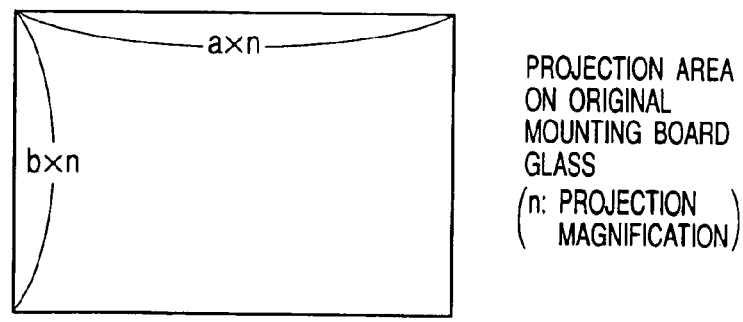
Figure 10C:
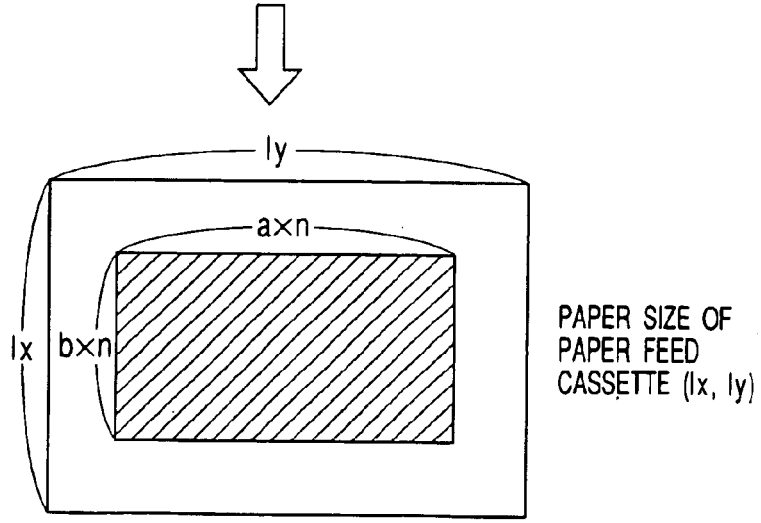

In FIG. 9, symbols a, b, c, d, e, and f indicate information of the image size on the film shown in FIG. 5 and symbol n indicates a magnification when the film is projected on the original mounting glass, wherein the corresponded relation in case of magnifying is shown in FIGS. 10A and 10B.

In each photographing size, symbols a, d, and f indicate long sides and usually, a is equal to e and d is equal to f.

Next, in a step 905, a minimum sized paper feed cassette is selected from a 1x ×1y sized paper feed cassette (refer to FIG. 10C) which paper size satisfies the condition indicated in FIG. 9.

The magnetic recorded information previously recorded on the film is read before an operation of reading the film image for producing image data to be printed in the above-mentioned process so as to grasp the size of a photographic image. Thereby, since the paper feed cassette can be determined at a quick timing, feeding a paper can be started before reading the film image. As a result, it is possible to perform applying at a high speed. At this time, an optimum applying paper can be selected if a user only sets the magnification without setting detailed conditions.

(Third Embodiment).

Figure 12:
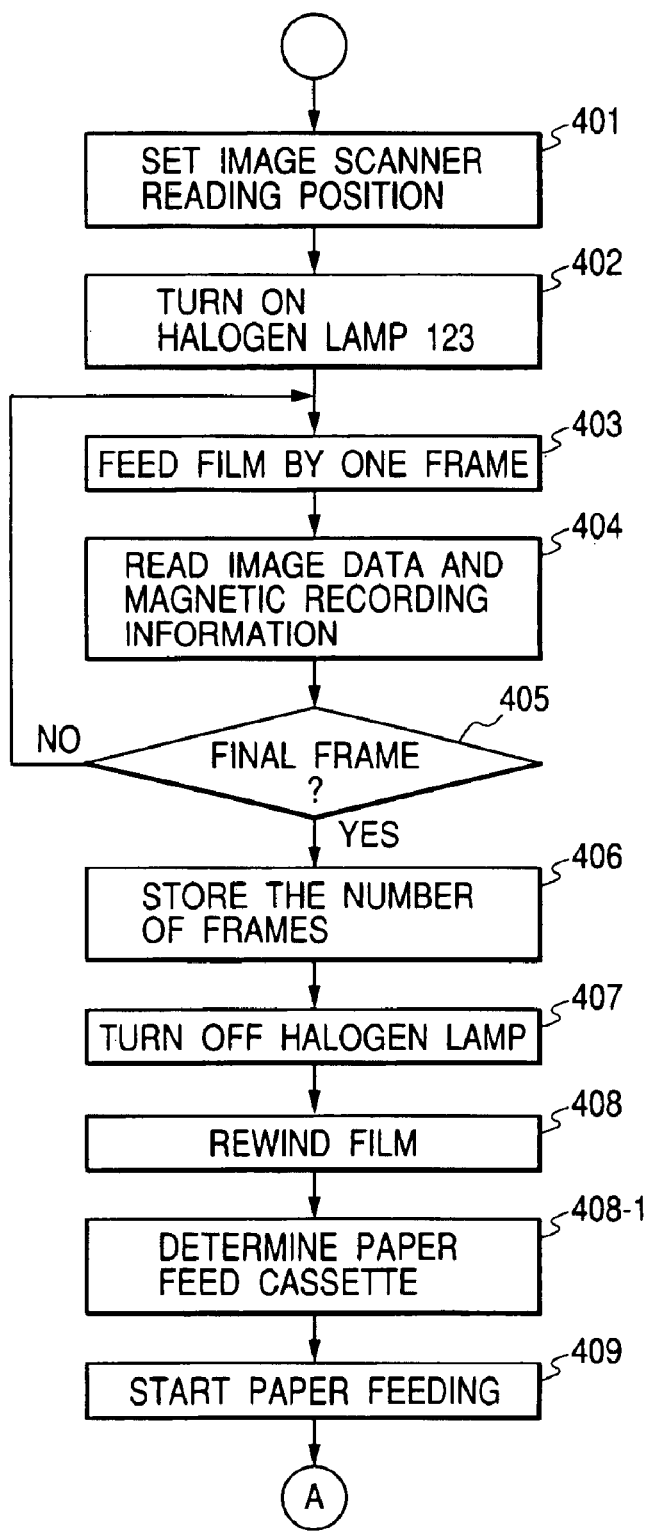
FIG. 12 which is composed of FIGS. 12A and 12B is a flow chart showing an operation of image processing in the third embodiment.
Figure 13:
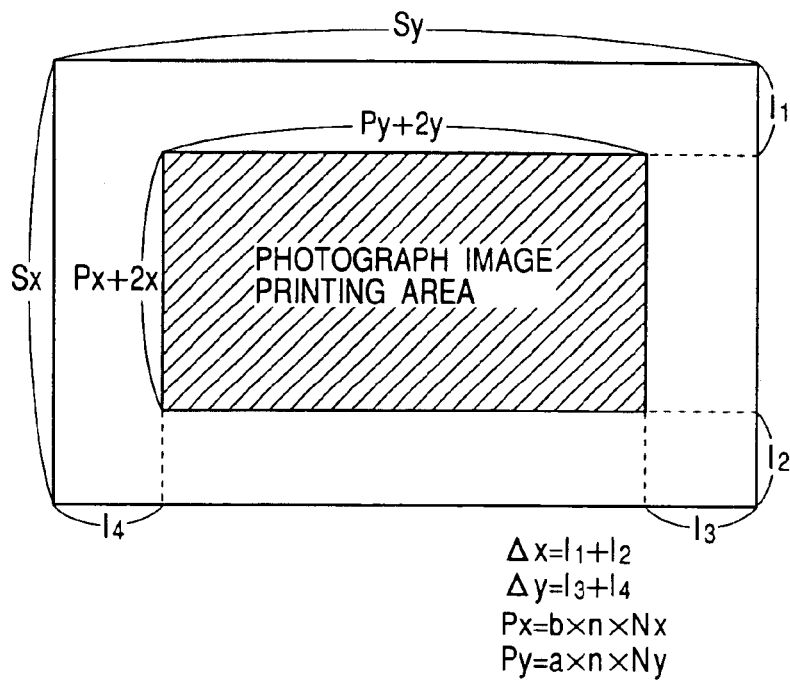
FIG. 13 is a view showing the printed state when the automatic zoom mode is set.

FIGS. 11 to 13 are views concerning a third embodiment of the present invention.

Figure 12B:
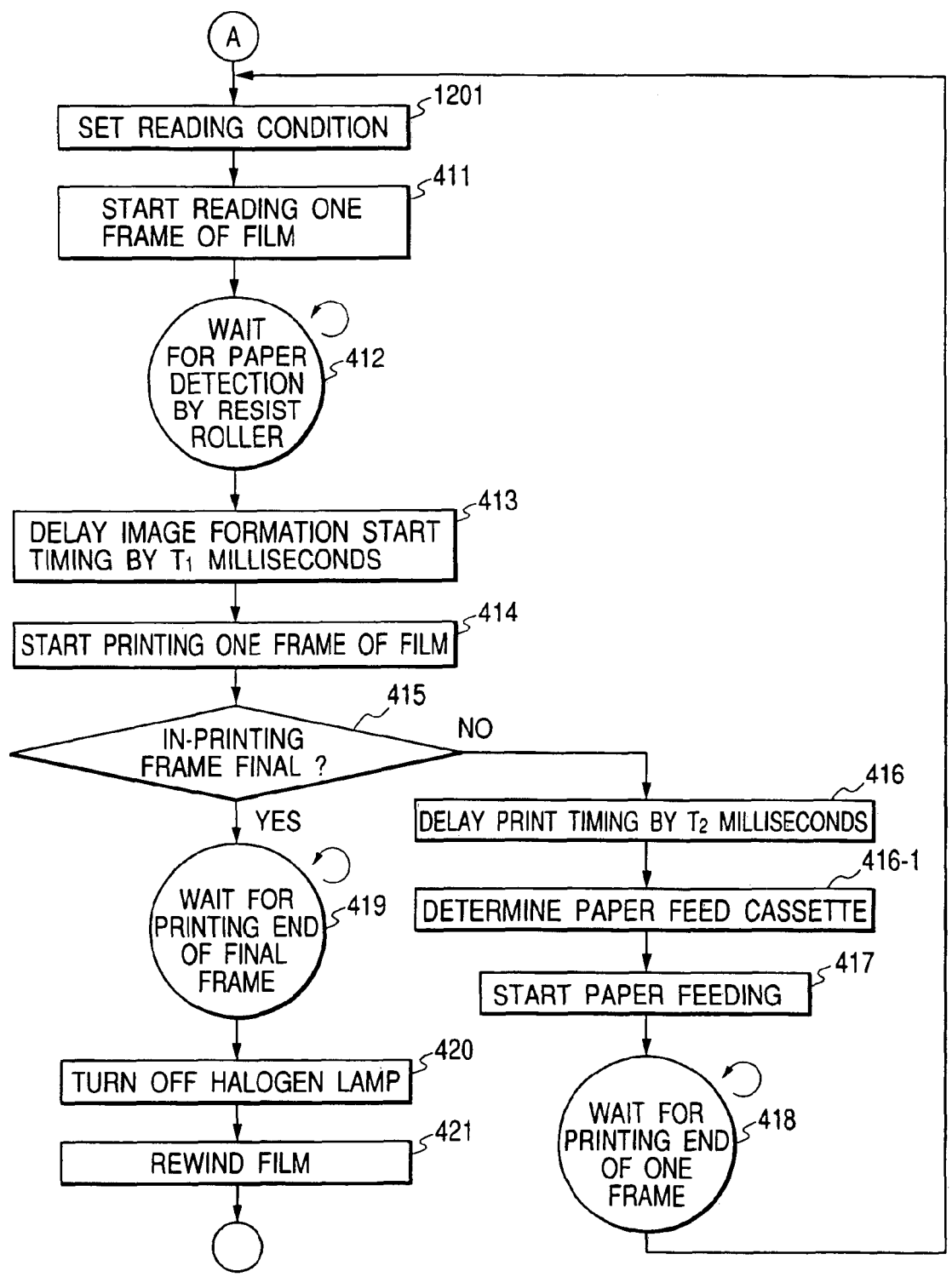

In the above first and second embodiments, the description is given in a case where a printing magnification is designated by an user. On the other hand, the present embodiment indicates the case for enabling to an automatic zoom to be performed. As shown in FIG. 11, as to the printing magnification, the case for designating the automatic zoom will be described. Since the procedure shown in FIGS. 12A and 12B is same as that of FIGS. 4A and 4B, the description will be omitted. However, a step 1201 which differs from the procedure in FIG. 4B only will be described in detail.

Figure 14:
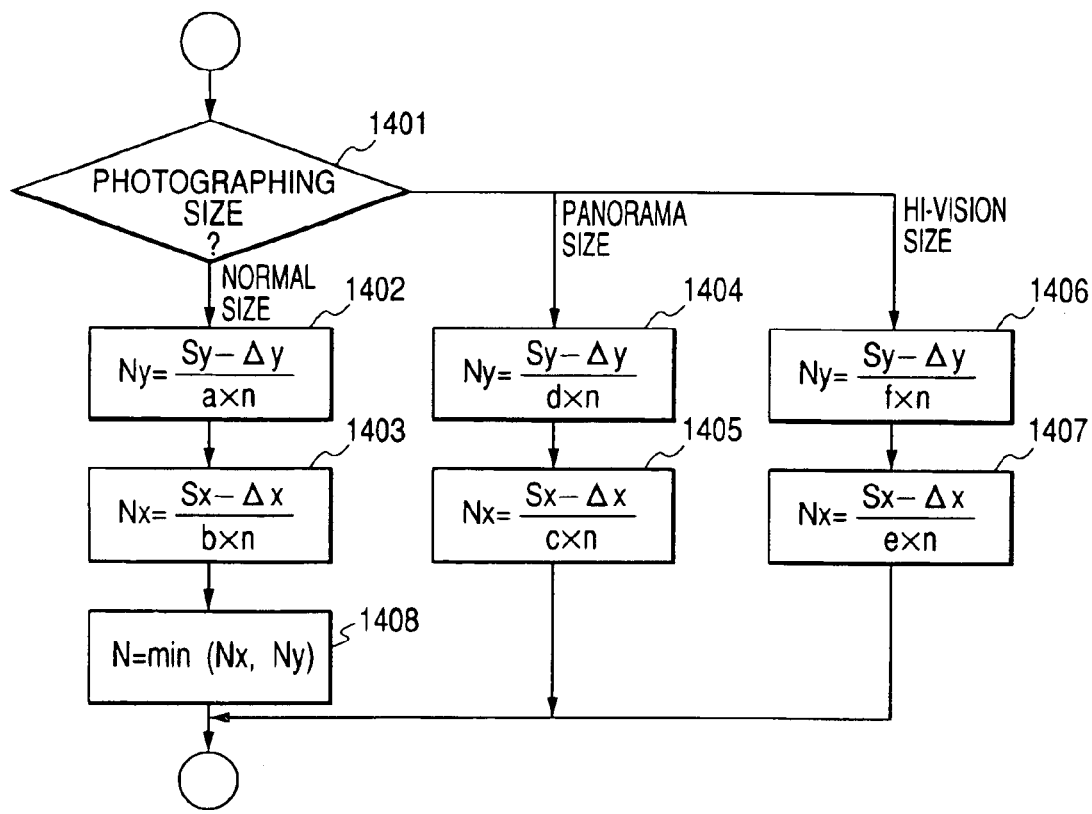
FIG. 14 is a flow chart showing a procedure of a process for executing the automatic zoom.

FIG. 14 is a flow chart for explaining a process for calculating the printing magnification in the step 1201 in FIG. 12B.

In a step 1401, it is judged if a frame corresponding to each magnetic record is the normal size, the panorama size or the hi-vision size on the basis of the previously read magnetic recorded information.

In case of the normal size, a process corresponding to steps to, 1403 and 1408 is executed. In case of the panorama size, a process corresponding to steps 1404 to 1405 is executed. In case of the hi-vision size, a process corresponding to steps 1406 to 1407 is executed.

In the steps 1402 to 1407, symbols a, b, c, d, e and f indicate information of the size (length) shown in FIG. 5. Symbols $\Delta_x$ and $\Delta_y$ indicate length of the margin space corresponding to a longitudinal side and a lateral side respectively, which are required at the time of printing.

In the step 1406, $N_x$ and $N_y$ are calculated based on an equation shown in FIG. 14 and a small value from $N_x$ and $N_y$ is defined as the printing magnification (that is, when N=1: same size, when N>1: enlarged size, and when N<1: reduction size). FIG. 13 shows the applied state in automatic zooming to be set as a parameter for zooming an image used when the film is read in the step 411.

In FIG. 13, such an image as producing a value of $a_x$ or $a_y$ (either value is always equal to 0) has to be applied in automatic zooming in accordance with the photographing size.

In addition to an effect of the first embodiment, the above-mentioned third embodiment has such an effect as the photographic image of each photographing size such as the normal size, the panorama size, the hi-vision size or the like can be efficiently applied to an applying paper which size is designated by reading the magnetic recorded information on the film previously and calculating the magnification in case of automatic zooming. As a result, an extra margin space can be deleted.

In the above-mentioned first to third embodiments, the paper used for printing is a standardized size, however, the present invention is not limited to this, but may be set to an exclusive use of the panorama size or the hi-vision size, of which aspect ratio is different from the standardized size, in case of the panorama size or the hi-vision size by selecting such a setting image plane as shown in FIG. 11, thereby, enabling to obtain a further excellent print image in the above-mentioned first to third embodiments.

As described above, according to the present invention, an image recorded on the film can be effectively formed by using additional information, which is recorded on the same film with the different method as compared to the method used in the above-mentioned image.

More particularly, since the image processing apparatus of the present invention comprises: optical read means for optically reading image data from a film, magnetic read means for magnetically reading additional information concerning a size of the image data from the film, and selection means for selecting and feeding a predetermined paper from a plurality of different papers on the basis of the information which is read by said magnetic read means, a paper adapted to the image size of the film can be fed.

In the present system, since an image and the additional information thereof are recorded on the same film (APS film), the additional information can be utilized if it is required. As the additional information is recorded magnetically, there is no influence on an image.

In a case where papers are sequentially fed by said selection means, since the (x+1)th paper is fed before terminating to print an image for the x-th paper fed by said selection means, a plurality of images can be printed at a high speed.

Since the size of the paper fed by said selection means can be set and the zoom ratio in case of printing the image data which is read by said optical read means is controlled in accordance with the information concerning the size of the image data, a paper of selected size can be used effectively. For example, the margin space of the selected paper can be reduced.

The present invention can be modified in various manners, within the scope of following claims.

What is claimed is:

1. An image processing apparatus comprising:

optical read means for optically reading image data from a film;

magnetic read means for magnetically reading additional information concerning a size corresponding to an aspect ratio of the image data from the film;

selection means for selecting and feeding a predetermined paper from among a plurality of paper storage units that store different size papers respectively on the basis of the additional information read by said magnetic read means; and setting means for manually setting each paper size corresponding to the additional information, wherein the additional information includes information concerning a normal size, a panorama size and a hi-vision size, said selection means selects, in case of setting the paper size other than the normal size, the paper which has a size larger than paper selected in case of setting the normal size, and control means for causing said selection means to start the feeding of the predetermined paper before the image data to be printed to the predetermined paper selected by said selection means based on the information of the film is read from the film by said optical read means, and for causing to perform, simultaneously, the reading of the image data from the film by said optical read means and the feeding of the predetermined paper by said selection means.

2. An apparatus according to claim 1, wherein a (x+1)th paper is fed before terminating a printing of an image for an x-th paper fed by said selection means in a case where papers are sequentially fed by said selection means.

3. An apparatus according to claim 1, wherein said selection means feeds paper of a size based on the additional information concerning the size of the image data.

4. An apparatus according to claim 1, wherein the size of a paper fed by said selection means is automatically determined in accordance with the additional information concerning the size of the image data.

5. An apparatus according to claim 1, further comprising:

control means for controlling a zoom ratio in case of printing the image data which is read by said optical read means in accordance with the additional information concerning the size of the image data.

6. An apparatus according to claim 1, further comprising:

feed means for feeding a paper selected by said selection means; and print means for printing an image corresponding to the image data which is read by said optical read means on a paper of predetermined size fed by said feed means.

7. An apparatus according to claim 1, wherein each of the different papers differs in its size or aspect ratio.

8. An image processing method comprising:

an optical-read step of optically reading image data from a film;

a magnetic read step of magnetically reading additional information concerning a size corresponding to an aspect ratio of the image data from the film;

a selection step of selecting and feeding a predetermined paper from among a plurality of paper storage units that store different size papers respectively on the basis of the additional information which is read by said magnetic read step; and a setting step of manually setting a paper size corresponding to the additional information, wherein the additional information includes information concerning a normal size, a panorama size and a hi-vision size, said selection step selects, in case of setting the paper size other than the normal size, the paper which has a size larger than paper selected in case of setting the normal size, and a control step for causing said selection step to start the feeding of the predetermined paper before the image data to be printed to the predetermined paper selected in said selection step based on the information of the film is read from the film in said optical read step, and for causing to perform, simultaneously, the reading of the image data from the film in said optical read step and the feeding of the predetermined paper in said selection step.

9. An image processing apparatus comprising:

first read means for reading an image from a film and producing image data by performing a photoelectric converting;

second read means for reading additional information concerning a size corresponding to an aspect ratio of the image data from the film without use of the photoelectric converting;

selection means for selecting and feeding a predetermined paper from among a plurality of paper storage units that store different size papers respectively on the basis of the additional information read by said second read means; and setting means for manually setting each paper size corresponding to the additional information, wherein the additional information includes information concerning a normal size, a panorama size and a hi-vision size, said selection means selects, in case of setting the paper size other than the normal size, the paper which has a size larger than paper selected in case of setting the normal size, and control means for causing said selection means to start the feeding of the predetermined paper before the image data to be printed to the predetermined paper selected by said selection means based on the information of the film is read from the film by said first read means, and for causing to perform, simultaneously, the reading of the image data from the film by said first read means and the feeding of the predetermined paper by said selection means.

10. An image processing method comprising:

a first read step of reading an image from a film and producing image data by performing a photoelectric converting;

a second read step of reading additional information concerning a size corresponding to an aspect ratio of the image data from the film without use of the photoelectric converting;

a selection step of selecting and feeding a predetermined paper from among a plurality of paper storage units that store different size papers respectively on the basis of the additional information by said second read step, and a setting step of manually setting a paper size corresponding to the additional information, wherein the additional information includes information concerning a normal size, a panorama size and a hi-vision size, said selection step selects, in case of setting the paper size other the normal size, the paper which has a size larger than paper selected in case of setting the normal size, and a control step for causing said selection step to start the feeding of the predetermined paper before the image data to be printed to the predetermined paper selected in said selection step based on the information of the film is read from the film in said first read step, and for causing to perform, simultaneously, the reading of the image data from the film in said first read step and the feeding of the predetermined paper in said selection step.

11. An image processing apparatus comprising:

an optical read unit adapted to optically read image data from a film;

a magnetic read unit adapted to magnetically read information from the film;

a selector adapted to select and feed a paper on the basis of the information read from the film; and a controller adapted to cause said selector to start the feeding of the paper before the image data to be printed is read from the film by said optical read unit, and to perform, simultaneously, the reading of the image data from the film by said optical read unit and the feeding of the paper by said selector.

12. An image processing apparatus comprising:

a first reader adapted to generate image data by reading an image from a film and photoelectrically converting the read image;

a second reader adapted to read information from the film without using the photoelectric conversion;

a selector adapted to select and feed a paper on the basis of the information read from the film; and a controller adapted to cause said selector to start the feeding of the paper before the image data to be printed is read from the film by said first reader, and to perform, simultaneously, the reading of the image data from the film by said first reader and the feeding of the paper by said selector.

13. An image processing method comprising the steps of:

optically reading image data from a film;

magnetically reading information from the film;

selecting and feeding a paper on the basis of the information read from the film; and controlling said selecting step to start the feeding of the paper before the image data to be printed is optically read from the film, and to perform, simultaneously, the optical reading of the image data from the film and the feeding of the paper.

14. An image processing method comprising the steps of:

generating image data by reading an image from a film and photoelectrically converting the read image;

reading information from the film without using the photoelectric conversion;

selecting and feeding a paper on the basis of the information read from the film; and controlling said selecting step to start the feeding of the paper before the image data to be printed is read from the film, and to perform, simultaneously, the reading of the image data from the film and the feeding of the paper.

* * * * *

UNITED STATES PATENT AND TRADEMARK OFFICE
CERTIFICATE OF CORRECTION

PATENT NO. : 6,879,372 B1  
DATED : April 12, 2005  
INVENTOR(S) : Yoichi Takaragi et al.

Page 1 of 1

It is certified that error appears in the above-identified patent and that said Letters Patent is hereby corrected as shown below:

<u>Title page,</u>
Item [*] Notice, insert:
-- This patent issued on a continued prosecution application filed under 37 CFR 1.539 (d), and is subject to the twenty year patent term provisions of 35 U.S.C. 154(a)(2). --.

<u>Column 1,</u>
Line 61, "above-mention" should read -- above-mentioned --.

<u>Column 2,</u>
Line 14, "of an" should be deleted.
Line 17, "of the" should be deleted.
Line 66, "magnetic" should read -- magnetically --.

<u>Column 6,</u>
Line 37, "in former" should be deleted.

<u>Column 11,</u>
Line 2, "other" should read -- other than --.

Signed and Sealed this

Twenty-fifth Day of April, 2006

JON W. DUDAS
*Director of the United States Patent and Trademark Office*